Oct. 31, 1972 W. S. BUSLIK ET AL 3,701,610

SUSPENSION SYSTEM FOR HOLDING A SLIDER

Filed Dec. 21, 1970

INVENTORS.
WALTER S. BUSLIK
ALBERT S. CHOU

BY Robert W. Keller
ATTORNEY

United States Patent Office 3,701,610

Patented Oct. 31, 1972

3,701,610

SUSPENSION SYSTEM FOR HOLDING A SLIDER

Walter S. Buslik, San Jose, and Albert S. Chou, Monte Sereno, Calif., assignors to International Business Machines Corporation, Armonk, N.Y.

Filed Dec. 21, 1970, Ser. No. 99,976
Int. Cl. G11b 5/60
U.S. Cl. 248—204 12 Claims

ABSTRACT OF THE DISCLOSURE

This invention teaches an assembly for holding a transducer-carrying T-shaped slider in compliance with a moving magnetic medium. The assembly comprises a suspension system including a flexure supporting the slider for allowing the slider to have freedom in pitch and roll and maintaining the slider in a constant yaw position, and a flexible supporting structure joined to the flexure. The supporting structure becomes stiff in the direction of access under load.

BACKGROUND OF THE INVENTION

Field of the invention

This invention is directed toward an assembly for holding a transducer-carrying slider in compliance with a magnetic medium. The assembly comprises a suspension system having a flexure supporting the slider for allowing the slider to have freedom of motion in pitch and roll, the flexure maintaining the slider in a constant yaw position, and a flexible supporting structure joined to the flexure. The supporting structure becomes stiff in a direction of access when a load is applied to the assembly. The flexure and the supporting structure are of unitary construction. In addition, the flexure is cross-shaped, having a first member affixed at its outer extremities to the supporting structure and having a second member perpendicular to the first member, thus forming the cross, the second member being affixed at its outer extremities to the slider. The first and second members are tapered outwardly from a wider central portion, thus allowing the slider to pitch and roll freely about the members. The supporting structure includes two arms which are most narrow in width at their outer extremities, while differential bending of each arm produces a freedom of pitching motion. Furthermore, the T-shaped slider has a pad on the underside of each of its three legs. To reduce access time, a transducer may be inserted in more than one of the pads of the slider or a second slider may be included at the outer extremity of a second set of arms extending from the supporting structure.

Description of the prior art

The magnetic disk files of today require a simple assembly for holding a transducer-carrying slider in compliance with a moving magnetic medium. Prior attempts to solve this problem have resulted in the development of complex gimbal and multiple flexure and ring structures that were constructed of several individual elements. Moreover, these suspension systems were very stiff and required high normal forces be applied to load the transducer into transducing relation with the medium. Still other suspension systems carried a transducing element at the outer extremity of a single narrow neck, thus offering little resistance to yaw motion.

As higher bit densities are recorded on magnetic medium, the criticality of compliance between a transducer and the medium becomes more acute, since major and minor disk runout may cause the pressure exerted on the transducer by its suspension system to change. In addition, systems utilizing contact recording or those having the transducer in contact with the medium when starting or stopping the medium require a minimization of wear degradation, thus necessitating a fast-acting compliant transducer.

An object of this invention is to provide a simple one-piece suspension system which provides the necessary compliance between a slider and a moving magnetic medium. This suspension system advantageously supports the slider in such a manner as to allow the slider to have freedom of motion in pitch and roll, while maintaining the slider in a constant yaw position.

Another object is to provide a suspension system having an extremely low mass to minimize wear between the slider and the magnetic medium and also requiring a low loading force.

Still another object is to provide an assembly for holding a transducer-carrying slider in compliance with a moving magnetic medium, comprising a suspension system having a flexure supporting the slider for allowing the slider to have freedom of motion in pitch and roll, the flexure maintaining the slider in a constant yaw position and a flexible supporting structure joined to the flexure, the supporting structure becoming stiff in the direction of access under load.

In accordance with the preceding object, it is still another object to provide an assembly of the type set forth wherein the flexure and the supporting structure are of unitary construction.

In accordance with the above objects, it is a further object to provide an assembly wherein the flexure is cross-shaped, having a first member affixed at its outer extremities to the supporting structure, and having a second member, perpendicular to the first member, the second member being affixed at its outer extremities to the slider.

It is still another object to provide a suspension system in an assembly comprising at least one T-shaped slider mounted to the outer extremities of the flexure with at least one magnetic transducer mounted to the slider.

Further objects of the invention pertain to the particular arrangement of the parts of the assembly and of the suspension system and T-shaped slider whereby the above-outlined and additional operating features thereof are attained.

The invention both as to its organization and method of operation, together with further objects and advantages thereof, will best be understood with reference to the following specification taken in connection with the accompanying drawing.

SUMMARY OF THE INVENTION

Figures 1, 2:
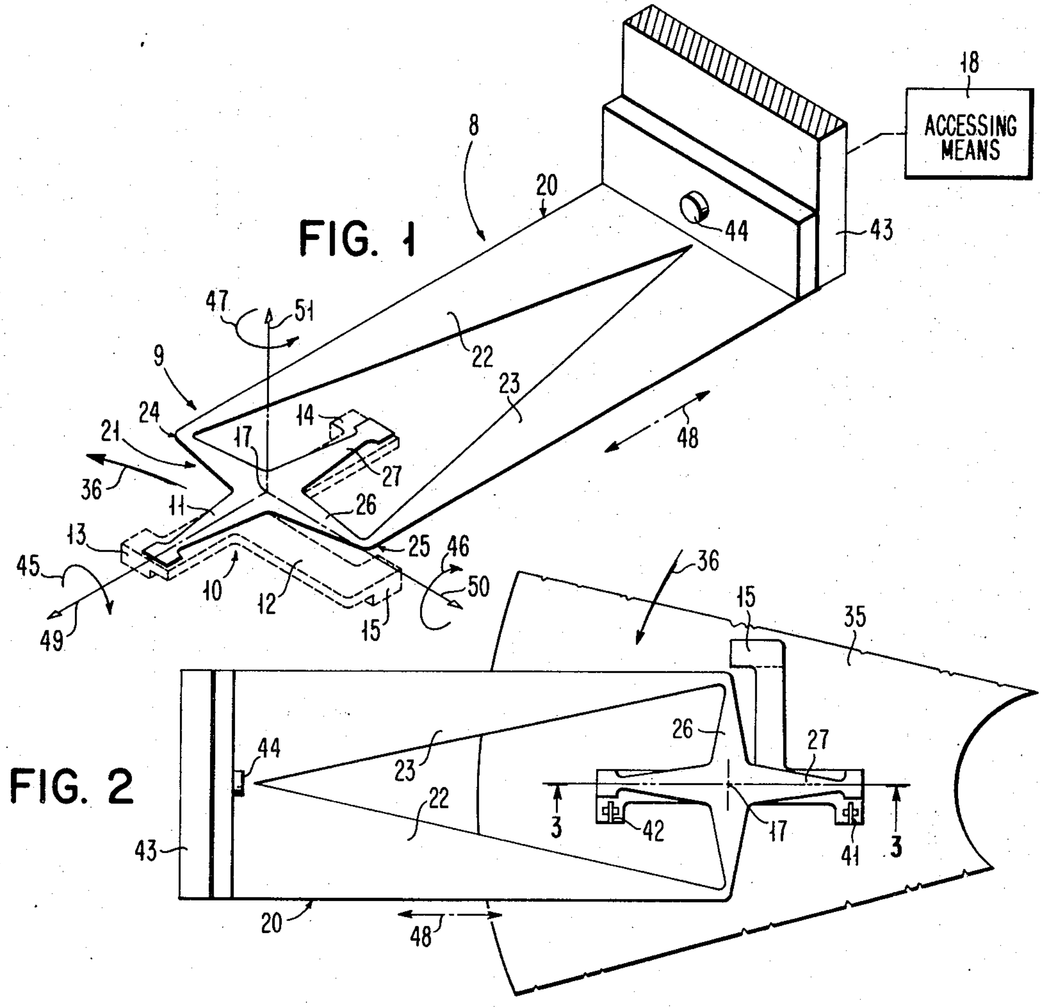
FIG. 1 is a perspective view of the assembly for holding the slider in compliance with the magnetic medium.
FIG. 2 is a plan view of the assembly of FIG. 1.

Referring to FIG. 1 of the drawings, an assembly 8 is illustrated for holding a slider 10 in compliance with a moving magnetic medium 35 which may preferably be a magnetic disk, but may also include magnetic tape. The assembly 8 comprises a suspension system, generally designated 9, which includes a cross-shaped flexure 21 and a flexible supporting structure 20. The butt portion of the supporting structure 20 is secured by screw 44 to mounting block 43 which is mechanically linked to accessing means 18 for linearly moving the entire assembly 8 back and forth in the access direction 48 to align the transducers 41 and 42 with the desired track of a magnetic medium 35. The transducers 41 and 42 are carried in slots in a T-shaped slider 10 which is supported by the flexure 21.

The suspension system 9, including the flexure 21 and supporting structure 20 is of a unitary construction and is fabricated from a 1.5 mil thick piece of stainless steel flat stock material by photoetching or punch pressing. Alternatively, either Elgiloy or Havar, which have high-endurance strengths and exhibit good corrosion-resistance properties, may be used. The suspension is cold-formed such that when deflected properly, it will produce the required normal load on the head through the load point at a depressed portion 29 in the center 17 of the flexure 21.

The cross-shaped flexure 21 includes a first member 26 that is mutually perpendicular to a second member 27. The members 26 and 27 are tapered outwardly from a wider central portion 17. The particular narrowing of these members thus allows the slider 10 to pitch 45 or twist freely about member 27 and to roll 46 or twist freely about member 26. The supporting structure 20 has two arms 22 and 23 with the respective outer extremities joined to and unitary with the outer extremities of the first member 26 of the flexure 21. It can be seen that the arms 22 and 23 are most narrow in width at their outer extremities, thus having less weight than arms without a taper. Since the arms 22 and 23 can move independently of one another, a differential bending of one arm in response to a variation in the surface contour of the medium 35 provides a pitch motion 45 of the slider 10. Furthermore, the tapering of the members 26 and 27 provides a greater resistance to yaw motion 47 than untapered members, thereby maintaining the slider in a constant yaw position.

The slider 10 is T-shaped, having a cross portion 11 and a leg portion 12. The slider may be machined from any non-magnetic ceramic that is light weight and possesses good wear properties. As illustrated, the slider 10 is machined so that each projection of portions 11 and 12 are slightly L-shaped with the underside recessed so as to define pads 13, 14 and 15. The bottom surface of the pads are lapped into a co-planar arrangement. As shown, the pads 13 and 14, at the trailing edge of the slider with respect to the direction of disk rotation 36, have a slot machined therein proximate to the trailing edge. A ferrite magnetic transducer 41 and 42 or read/write element is then glass-bonded into the slot. The transducer-carrying portion of pads 13 and 14 and the leading pad 15 create a triangle such that the mass associated with each pad and the relative positions of all pads create the desired distribution of the load. More stability is achieved when the transducers are mounted closest to the trailing edge of the slider pad. The slider 10 is secured to the suspension system 9 by gluing the upper surface of the cross portion 11 of the slider 10 to the under side of the tab-shaped outer extremity of the second member 27. Alternatively, the slider may be clamped or bolted in position.

Thus, a transducing assembly having two read/write elements that are mounted on the same slider has been described. Preferably the elements will be spaced an odd number of tracks apart, for decreasing the amount of time required to radially servo or access the entire disk surface to the desired track. As can be seen in the preferred embodiment of this invention, as illustrated in FIGS. 1 and 2, the pad 15 serves to stabilize the assembly 8 if the slider is air bearing. In contact recording systems, since three points determine a plane, the planar pads 13, 14 and 15 all are able to maintain contact with the disk. Alternatively, a single transducer may be utilized. In this instance the cross-portion 11 of the T-shaped slider 10 would lead the leg portion 12 with the transducer being mounted near the trailing edge of the leg. Accordingly, the cross-portion would be analogous to an outrigger, thus improving stability and compliance.

The flexible, resilient supporting structure 20 is pre-bent to its desired unloaded shape and normally has its arms 22 and 23 in a cantilevered drooping condition at points spaced near the flexure 21. In operation, as the accessing means 18 positions the slider on the disk with a predetermined force, the reactive force between the slider and the disk flattens the arms 22 and 23 into a plane parallel to the surface of the disk. Once in this plane, the arms remain relatively stiff in the access direction 48. In loading the transducers into transducing relation to the disk, the load is transmitted through the depressed portion 29 of the flexure 21 to the slider 10 and then to the transducers 41 and 42 and the pads 13, 14 and 15. The load is distributed to each pad due to the particular geometry described to produce the required load on each pad. If desired, the force distribution can be changed by shifting the load point. Preferably, the load is about 0.75 gram on each pad, although it may range upwards from 10 grams.

As the assembly 8 is loaded into transducing relation with the disk 35, the combination of the tapered cross-shaped flexure 21 and the cantilevered arms 22 and 23 freely allow the slider to pitch 45 about the member 27 and roll 46 about the member 26. Furthermore, the stiffened arms 22 and 23 and tapered members 26 and 27 prevent unwanted oscillation or yaw rotation 47 about the axis 51, thus maintaining the slider in a constant yaw position. In addition, the suspension system 9 is relatively stiff in the direction of access motion 48 and in the direction of disk rotation parallel to the axis 50, thus preventing disk modulation and spacing changes between the transducers and the medium.

In accordance with the above, a simple assembly has been invented for holding a transducer-carrying slider in compliance with the surface variations and a moving magnetic disk. This assembly includes a flexure and a supporting structure. The flexure supports the slider and allows the slider to have freedom of motion in pitch and roll directions, thus allowing the transducer to maintain compliance over the disk contour during operation. Also, the flexible supporting structure which is unitary with the flexure becomes stiff in the direction of access once the slider is loaded into proximity with the disk surface. Thus, the supporting structure changes from an unloaded drooping position to a loaded straightened beam or column. This invention is shown as embodied in a flying transducing arrangement, although it may be also utilized in contact recording or pseudo contact recording.

Figure 4:
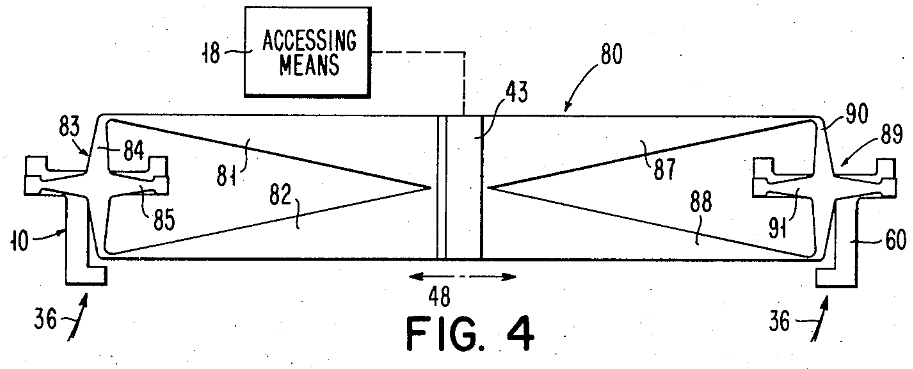
FIG. 4 is a plan view of a second embodiment of the invention illustrating a dual slider configuration.
Figure 3:
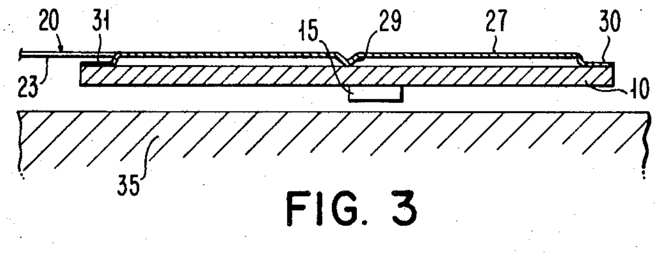
FIG. 3 is an elevational section view of the assembly taken along the lines 3—3 of FIG. 2.

An alternative embodiment is shown illustrated in FIG. 4. As shown therein, a dual slider configuration is utilized. The mounting block 43 which is moveable by accessing means 18 has a flexible supporting structure 80 which comprises a first set of arms 81 and 82 joined to a first cross-shaped flexure 83 comprising a first member 84 and a second member 85 carrying slider 10, similar to the embodiment illustrated in FIG. 1, and a second set of arms 87 and 88 which extend outwardly in a direction opposite to that of the first set of arms. Arms 87 and 88 are joined to the outer extremities of a third member 90 of a second cross-shaped flexure 89. A fourth member 91, perpendicular to third member 90 is affixed to a second T-shaped slider 60, similar to slider 10, having at least one transducer mounted in one of its pads.

The two sliders 60 and 10 each access one-half of the radial recording surface of the medium 35, thus reducing the distance traveled, and, correspondingly, the time required, during the accessing of the transducer to the information contained on the disk. Also, the data could be arranged so that two tracks become available without accessing.

Thus, an improved suspension assembly has been described which provides a simple slider and a simple suspension and which minimizes wear problems between the contacting surfaces of the magnetic transducer and the disk and which readily reduces access time. The one-piece suspension provides the required compliance and stiffness and is simple in design and construction, therefore being readily mass produced at a low cost.

While there has been described what are, at present, considered to be the preferred embodiments of the invention, it will be understood that various modifications may be made therein, and it is intended to cover in the appended claims all such modifications as fall within the true spirit and scope of the invention.

What is claimed is:

1. An assembly for holding a transducer-carrying slider in compliance with a moving magnetic medium, comprising:

a suspension system having:

a flexure supporting said slider for allowing said slider to have freedom of motion in pitch and roll, and said flexure maintaining said slider in a constant yaw position; and a flexible supporting structure comprising a first set of two arms with the respective outer extremities thereof joined to said flexure, said arms becoming substantially parallel to the medium surface under load from a preformed curved shape, and each of said flexible arms being bendable, whereby differential bending of said arms produces a pitching motion of said slider.

2. The assembly set forth in claim 1, wherein said load is between 1.5 and 10 grams and is in a direction normal to said stiffened supporting structure.

3. The assembly set forth in claim 1, wherein said flexure and said supporting structure are of unitary construction.

4. The assembly set forth in claim 12, wherein said supporting structure comprises a first set of two arms with the respective outer extremities thereof affixed to one of the outer extremities of said first member.

5. The assembly set forth in claim 4, wherein said first and second members of said flexure are tapered outwardly from a central portion for allowing said slider to pitch and roll freely about said members.

6. The assembly set forth in claim 12, and further comprising a T-shaped slider mounted to the outer extremities of said second member of said flexure and at least one magnetic transducer mounted to said slider.

7. The assembly set forth in claim 6, wherein the outer extremities of the underside of each of the three outwardly extending projections of said T-shaped slider defines a pad.

8. The assembly set forth in claim 7, wherein at least one of said pads has a magnetic transducer mounted therein.

9. The assembly set forth in claim 7, wherein the leg portion trails the cross portion of said T-shaped slider, said cross portion thus stabilizing said assembly, and wherein said magnetic transducer is mounted rearward in said leg portion.

10. The assembly set forth in claim 7, wherein the leg portion leads the cross portion of said T-shaped slider and wherein a magnetic transducer is mounted rearward in said pad disposed at each outer extremity of said cross portion.

11. The assembly set forth in claim 6, and further comprising a second T-shaped slider;

at least one magnetic transducer mounted to said second T-shaped slider;

a second cross-shaped flexure having a third member and a fourth member perpendicular to said third member, said second slider mounted below the outer extremities of said fourth member; and wherein said supporting structure includes a second set of two arms extending outwardly in a direction opposite to that of said first set of arms, said second set of arms having the outer extremities thereof affixed to the outer extremities of said third member of said second flexure.

12. An assembly for holding a transducer-carrying slider in compliance with a moving magnetic medium, comprising:

a cross-shaped flexure having mutually perpendicular first and second members; and a flexible supporting structure joined to the outer extremities of said first member, said second member being affixed at its outer extremities to said slider, said flexure supporting said slider for allowing said slider to have freedom of motion in pitch and roll and for maintaining said slider in a constant yaw position, and said supporting structure becoming stiff in a plane parallel to said magnetic medium under load.

References Cited

UNITED STATES PATENTS

| | | | |
|---|---|---|---|
| 3,593,330 | 7/1971 | Ackley | 340—174.1 F |
| 3,489,381 | 1/1970 | Jones et al. | 267—160 X |
| 3,528,067 | 9/1970 | Linsley et al. | 340—174.1 F |
| 3,460,244 | 8/1969 | Metz | 340—174.1 F UX |
| 3,403,388 | 9/1968 | Linsley | 340—174.1 F |
| 3,072,752 | 1/1963 | Charnetsky et al. | 179—100.2 C |

J. FRANKLIN FOSS, Primary Examiner

U.S. Cl. X.R.

340—174.1 F